TRUTH TABLE

| IN $V_1$ | IN $V_0$ | TUNNEL DIODE STATE | WORD LINE OUT |
|---|---|---|---|
| ✓ | | 0 | ✓ |
| ✓ | | 1 | — |
| | ✓ | 0 | — |
| | ✓ | 1 | ✓ |

RALPH J. KOERNER
SAMUEL NISSIM
INVENTORS

RALPH J. KOERNER
SAMUEL NISSIM
INVENTORS

Aug. 1, 1967 R. J. KOERNER ET AL 3,334,336

MEMORY SYSTEM

Original Filed April 30, 1962 3 Sheets-Sheet 3

RALPH J. KOERNER
SAMUEL NISSIM
INVENTORS

United States Patent Office 3,334,336
Patented Aug. 1, 1967

3,334,336
MEMORY SYSTEM

Ralph J. Koerner, Canoga Park, and Samuel Nissim, Pacific Palisades, Calif., assignors, by mesne assignments, to The Bunker-Ramo Corporation, Stamford, Conn., a corporation of Delaware
Original application Apr. 30, 1962, Ser. No. 191,212, now Patent No. 3,284,775, dated Nov. 8, 1966. Divided and this application Feb. 28, 1966, Ser. No. 544,053
10 Claims. (Cl. 340—173)

This application is a division of Ser. No. 191,212, filed Apr. 30, 1962, now Patent No. 3,284,775.

This invention relates generally to memory apparatus for storing digital information and, more particularly to apparatus employing unique memory cells and having properties permitting it to be searched by content rather than by location.

Conventionally, information is accessed from a random-access memory by providing signals, representing an address of a memory location, to some decoding means and consequently directing interrogation pulses through the appropriate memory cells. In situations, where the address of the memory location in which the desired information is stored is not known, it is necessary to search the entire memory. In conventional memories, this is done by sequentially reading out the contents of each location and comparing the contents with the desired information hereafter called the *search word*. It will be realized that in a memory of, for example, 1000 words, such a procedure would consume at least 1,000 times the time it would take to access a single word.

In view of this excessively long search time, content addressable memories, as disclosed in Ser. No. 828,964, filed July 23, 1959, by Ralph J. Koerner, have recently been developed. In a content addressable memory, data is called forth in terms of some feature or features of its own information content rather than, as in conventional random-access memories, in terms of its memory location address. Content addressable memories are distinguishable also from serial-access memory embodiments since content addressable configurations permit all words in memory to be *simultaneously* interrogated for identity with the search word.

As with random-access memories, for purposes of explanation, a content addressable memory can be considered as a rectangular matrix wherein horizontal rows of cells comprise a word location and vertical columns comprise corresponding bits in each word location. Broadly, content addressable memories are searched by simultaneously applying interrogation signals, representative of the bits of a search word, to the corresponding bits of all of the words in memory, i.e., along a vertical column, such that output signals are generated wherever there is a mismatch between the bit of the search word and the bit of the stored word. By then summing the output signals generated with respect to the bits of each word, i.e., along a horizontal row, a stored word matching the search word can be located by detecting a sum of zero. In order to implement this technique such that an output signal is generated only in no match situations and not in match situations, two storage elements have heretofore been required for each bit in memory, each assuming the complementary state of the other.

In addition to being useful for purposes of expediting a search, content addressable properties can be employed in associative memories wherein the length of the search word is some fraction of the length of the stored word and the additional bits in the stored word define some address pattern for the next search and/or instruction. Such an associative scheme provides the memory with built-in logic capabilities.

Although most high-speed random-access memory configurations presently utilized have some form of magnetic core as a storage element, recent attempts have been made to extend the state of the art by employing other elements which can be switched more rapidly. One such attempt is discussed in U.S. Patent No. 3,198,958, wherein a negative resistance device such as a tunnel diode, is employed. It is therein pointed out that in view of the ability of the tunnel diode to be switched very rapidly coupled with its ability to be read nondestructively, the tunnel diode has considerable potential for use in large scale memories.

In light of the above, it is an object of the present invention to provide a content addressable memory which can be operated at considerably faster speeds than heretofore known configurations.

It is an additional object of the present invention to provide a memory cell configuration, suitable for use in content addressable memories, which can be read nondestructively and which is less expensive and requires fewer memory elements than heretofore known configurations.

Briefly, the invention herein comprises a content addressable memory employing an improved memory cell based on the recognition that a negative resistance device loaded for bistable operation exhibits different first and second voltage drops thereacross, corresponding to its first and second stable states of operation, and that as a consequence, two different potentials can be made available at each terminal of the negative resistance device so that these potentials can be used to control a pair of switches, which can comprise unidirectional current conducting elements, by respectively forward and back biasing a first unidirectional element coupled to one terminal of the device and back and forward biasing a second unidirectional element coupled to the other terminal of the device whereby the state of the device can be ascertained by attempting to drive a current through a selected one of said unidirectional elements such that the attempt will be unsuccessful if the selected element is back biased.

More particularly, the invention herein discloses a content addressable memory employing a memory matrix requiring but one memory element per each bit of storage capacity. Although the preferred embodiment shown utilizes a tunnel diode as the memory element, any negative resistance device, i.e., a device exhibiting an "N" or "S" current-voltage curve, would be suitable. The memory is searched by driving signals, representing a search word, along the two matrix columns connected to the terminals of the memory elements of that column so as to develop output signals on word lines, each of which is uniquely associated with all the memory cells along one of the matrix rows, when the information stored in a cell is different from the information in a corresponding bit position of the search word. A null, i.e., the absence of an output signal on a word line therefore indicates that the information stored in the cells associated with that word line matches the search word. Means are provided for inverting the null into a usuable signal, referred to as a match signal.

Equipment is provided to enable the located information to then be read out, sequentially in the case of nonunique matches. In addition, equipment is provided for permitting logical decisions to be made on the basis of how many matches occur. Additionally, means are introduced to demonstrate the manner in which locations are selected in which information is to be written and how in turn information is written into memory. Further, each memory cell itself is recognized as being capable of performing simple logical functions.

Reference is now made to the accompanying drawings forming a part hereof wherein like numerals refer to like parts throughout, and in which:

FIG. 1(*b*) is a diagram illustrating various input signals applied to the cell of FIG. 1(*a*) and various output signals derived therefrom;

FIG. 1(*c*) is a plot of current I vs. voltage V pertaining to the cell of FIG. 1(*a*) and offered only to illustrate the action of the tunnel diode thereof;

FIG. 1(*d*) is a table summarizing the operation of the cell of FIG. 1(*a*);

Figures 1A, 1B, 1C, 1D:
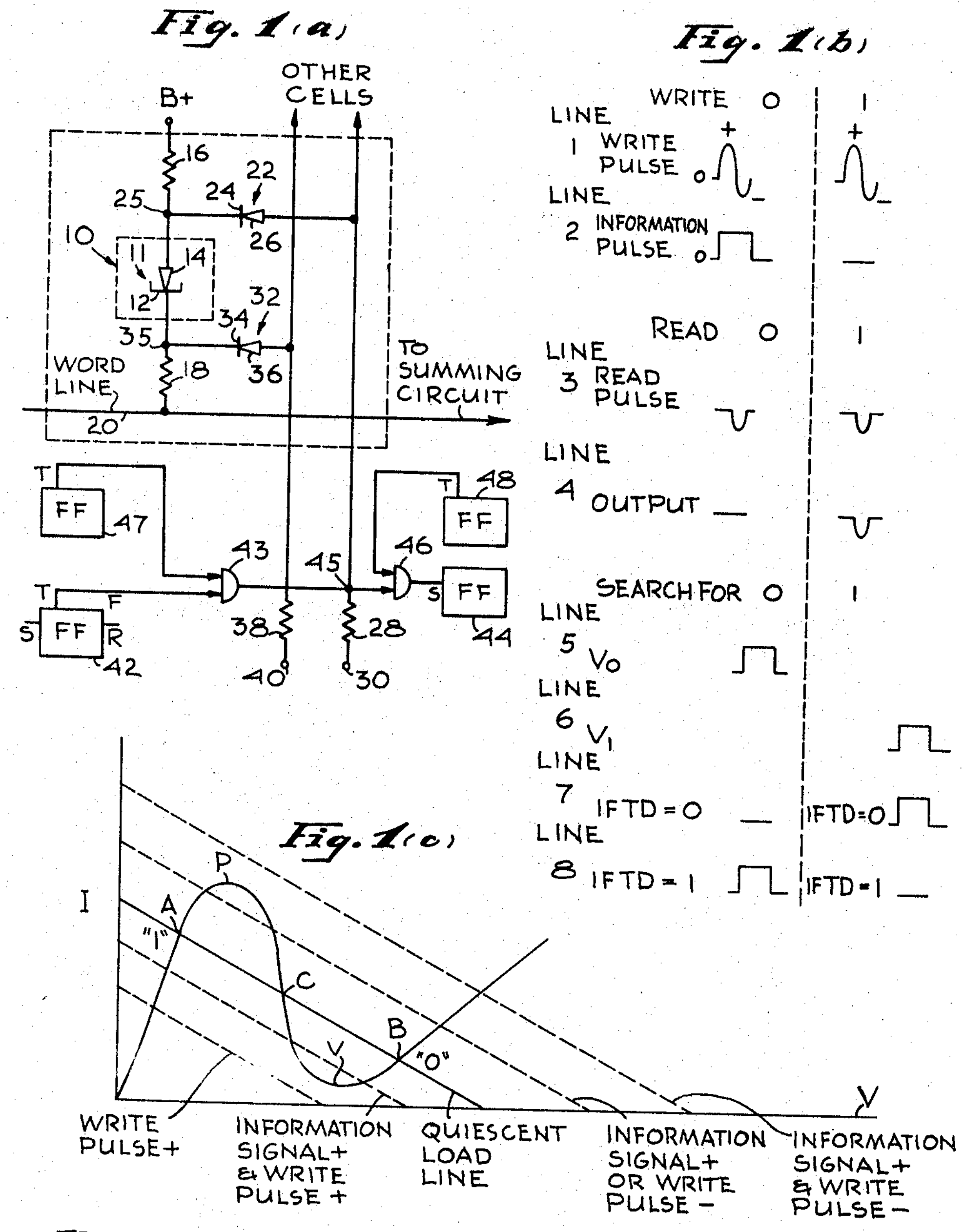
FIGURE 1(*a*) is a schematic diagram of a memory cell utilized in the content addressable memory configuration shown in FIG. 2.

With continuing reference to the drawing, initial attention is called to FIG. 1(*a*) wherein the details of a memory cell, designed in accordance with the inventive principles herein are illustrated. The memory cell includes a negative resistance element 10 preferably comprising a tunnel diode 11 having a cathode 12 and anode 14. A resistor 16 connects anode 14 to a source of positive voltage B+ while resistor 18 connects cathode 12 to a word line 20. A first switch preferably comprising a conventional doide 22 has its cathode 24 connected to the junction 25 between resistor 16 and tunnel diode anode 14 and its anode 26 connected through resistor 28 to input terminal 30. A second switch preferably comprising a conventional diode 32 has its cathode 34 connected to the junction 35 between tunnel diode cathode 12 and resistor 18 and its anode 36 through resistor 38 to terminal 40. A data write flip-flop 42 has its true output terminal connected through "and" gate 43 to the junction 45 between resistor 28 and anode 26 of diode 22 while a data read flip-flop 44 has its set input terminal connected to the junction 45 through "and" gate 46. The true output terminals of write and read control flip-flops 47 and 48 are respectively connected to "and" gates 43 and 46.

All flip-flops referred to herein can be considered to be of the conventional R-S type and will merely be illustrated as boxes having the set input terminal extending perpendicular to the left side, the reset input terminal extending perpendicular to the right side, and the true and false output terminals extending respectively from the left and right portions of the top side. Additionally, it should be realized that the polarity of the various diodes, bias sources, etc. could be appropriately reversed without significantly changing the operation of the cell.

Attention is now called to FIG. 1(*c*) wherein current-voltage characteristics of the tunnel diode (N curve) are plotted together with the load line of the circuit in which the tunnel diode is connected. At points A and B, comprising intersections between the load line and the tunnel diode characteristic, unconditionally stable operating states exist. The stable state existing at point A is characterized by high current and low voltage (approximately 50 mv.) while the stable state existing at point B is characterized by low current and high voltage (approximately ½ volt). Arbitrarily, the tunnel diode will be considered as storing a binary "1" when operating at point A and a binary "0" when operating at point B. The third intersection between the load line and the tunnel diode characteristic, point C, represents an unstable state of equilibrium, although a conditionally stable state may exist under some circumstances which need not be considered for purposes of the present invention.

In order to switch the state of the tunnel diode from state "1" to "0", it is necessary to temporarily move the load line from its quiescent position with respect to the tunnel diode characteristic so as to shift the point of operation past the peak P thereby permitting the tunnel diode to assume state "0" when quiescent conditions are again established. In order to move the load line, a positive pulse of sufficient amplitude can be applied to input terminal 30 or alternatively a negative pulse of sufficient amplitude can be applied to word line 20. Either of these techniques or some combination of these techniques would push the operation of the tunnel diode past peak P permitting it to assume state "0". On the other hand, in order to shift the operation of the tunnel diode from point B to point A, the load line must be moved to the left past the valley point V. This can be done by providing a negative pulse on terminal 30 or a positive pulse on word line 20 or some combination of these two techniques.

Specifically, line 1 of FIG. 1(*b*) illustrates the write pulse utilized to write information into the memory cell of FIG. 1(*a*). The write pulse applied to word line 20 comprises an initial positive voltage excursion from ground followed by a negative voltage excursion below ground. In order to write a "0," i.e., cause the tunnel diode to assume state "0" or operate at point B, an information signal comprising a positive pulse as indicated on line 2 of FIG. 1(*b*) is applied to terminal 30. Inasmuch as the initial positive excursion on the word line acts in opposition to and is greater than the positive excursion on terminal 30, the load line is moved slightly to the left as shown in FIG. 1(*c*). This movement, regardless of whether the tunnel diode was operating at point A or B, is insufficient to switch the state of the tunnel diode. However, subsequent to the positive excursion, the signal applied to word line 20 becomes negative, and accordingly adds to rather than opposes the positive voltage applied to terminal 30 and therefore moves the load line to the right as indicated in FIG. 1(*c*). Had the tunnel diode been operating at point A, this movement of the load line would have shifted the operational point past peak P causing the tunnel diode to thereafter operate at point B. Had the tunnel diode been operating at point B, apparently no switching would have occurred and it would continue to operate at point B. It should, therefore, be apparent that regardless of what state the tunnel diode was initially in, the application to the circuit of the initial pulses shown in lines 1 and 2, respectively, of FIG. 1(*b*) result in the tunnel diode assuming state "0".

In order to write a "1", that is cause the tunnel diode to operate at point A, the same write pulse can be applied to word line 20 as was applied in order to write a "0" but no voltage excursion should be applied to terminal 30. This is illustrated in lines 1 and 2 of FIG. 1(*b*) to the right of the vertical dotted line. It will be realized that the positive excursion of the signal on the word line 20 moves the load line to the left and if the tunnel diode had been operating at point B, its operation is moved past the valley point V causing the tunnel diode to thereafter operate at point A. Had the tunnel diode been operating at point A, of course it will continue to operate there. During the second portion of the application of the write pulse to the word line, the load line tends to move to the right as indicated in FIG. 1(*c*) but however, its amplitude is insufficient to move the operation of the tunnel diode past the peak P and accordingly the tunnel diode remains in state "1." It will, therefore, be realized that regardless of whether the tunnel diode had been in state "0" or "1," application to the circuit of the pulses on lines 1 and 2 to the right of the vertical dotted line in FIG. 1(*b*), will cause the tunnel diode to assume state "1."

When tunnel diode 11 stores a binary "1," word line 20 being at ground, a high current is drawn through resistor 16 and accordingly the potential at point 25 is relatively low as compared with the potential when tunnel diode 11 stores a binary "0" and there is a small drop across resistor 18.

Accordingly, in order to determine at any time whether a binary "1" or "0" is stored by the tunnel diode 11, a negative read pulse (FIG. 1(*b*), line 3) identical to the negative excursion comprising the second portion of the write pulse in line 1 can be applied to word line 20. If the tunnel diode stores a "1," the negative pulse on word line 20 will draw a current through resistor 28 and forward biased diode 22. Consequently, a negative pulse will appear at junction 45 on the anode side of diode 22 and this can be detected by data read flip-flop 44 so long as read control flip-flop 48 is true. If, on the other hand, tunnel diode 11 stores a "0," diode 22 will be back biased and the application of the negative read pulse to word line 20 will not draw a current through resistor 28 and diode 22 and consequently will not generate the negative pulse at junction 45.

In lieu of reading the state of the tunnel diode 11 by applying the negative read pulse shown in line 3 of FIG. 1(*b*), a positive pulse of sufficient amplitude can be applied to terminal 30. If the tunnel diode 11 stores a "1," application of a positive pulse $V_0$ (FIG. 1(*b*), line 5) to terminal 30 will drive a current through resistor 28 and diode 22. The positive pulse (FIG. 1(*b*), line 8) consequently generated on the anode side of diode 22 can be detected by data read flip-flop 44 again under the control of read control flip-flop 48. If, on the other hand, tunnel diode 11 stores a "0," the resulting high potential at junction 25 would back bias diode 22 and the application of the same positive pulse $V_0$ to terminal 30 if insufficient to overcome the back bias will not generate a positive pulse at junction 25 (FIG. 1(*b*), line 7).

It should be realized that terminal 40 can be similarly used to ascertain the state of the tunnel diode 11. If the tunnel diode stores a "0," application of a positive pulse $V_1$ (FIG. 1(*b*), line 6) of sufficient amplitude to terminal 40 will drive a current through resistor 38 and diode 32 and consequently generate a positive excursion at the junction between diode 32 and resistor 38. On the other hand, if the tunnel diode 11 stores a "1," diode 32 is back biased by the relatively high potential at junction 35 and application of the positive pulse $V_1$ to terminal 40 if insufficient to overcome the back bias will not cause a positive excursion at the junction between diode 32 and resistor 38.

From the above, it should be appreciated that a signal is passed to word line 20 when tunnel diode 11 stores a "1" and pulse $V_1$ is applied to terminal 30, or when tunnel diode 11 stores a "0" and pulse $V_0$ is applied to terminal 40. On the other hand, no signal is passed to word line 20 when tunnel diode 11 stores a "0" and pulse $V_1$ is applied to terminal 30 or when tunnel diode 11 stores a "1" and pulse $V_0$ is applied to terminal 40. This action is summarized in the truth table of FIG. 1(*d*).

Aside from summarizing the memory function of the cell of FIG. 1(*a*), the table of FIG. 1(*d*) illustrates the utility of the cell for performing logical functions such as "and," "or," etc. It should also be appreciated from the foregoing discussion that information can be read from the cell without destroying the contents thereof. More particularly, it will be recalled that regardless of which of the alternative technique is utilized to read the state of the tunnel diode, none cause the tunnel diode to switch. Therefore, the cell can be read a limitless number of successive times without requiring the restoration of the information therein.

Figure 2:
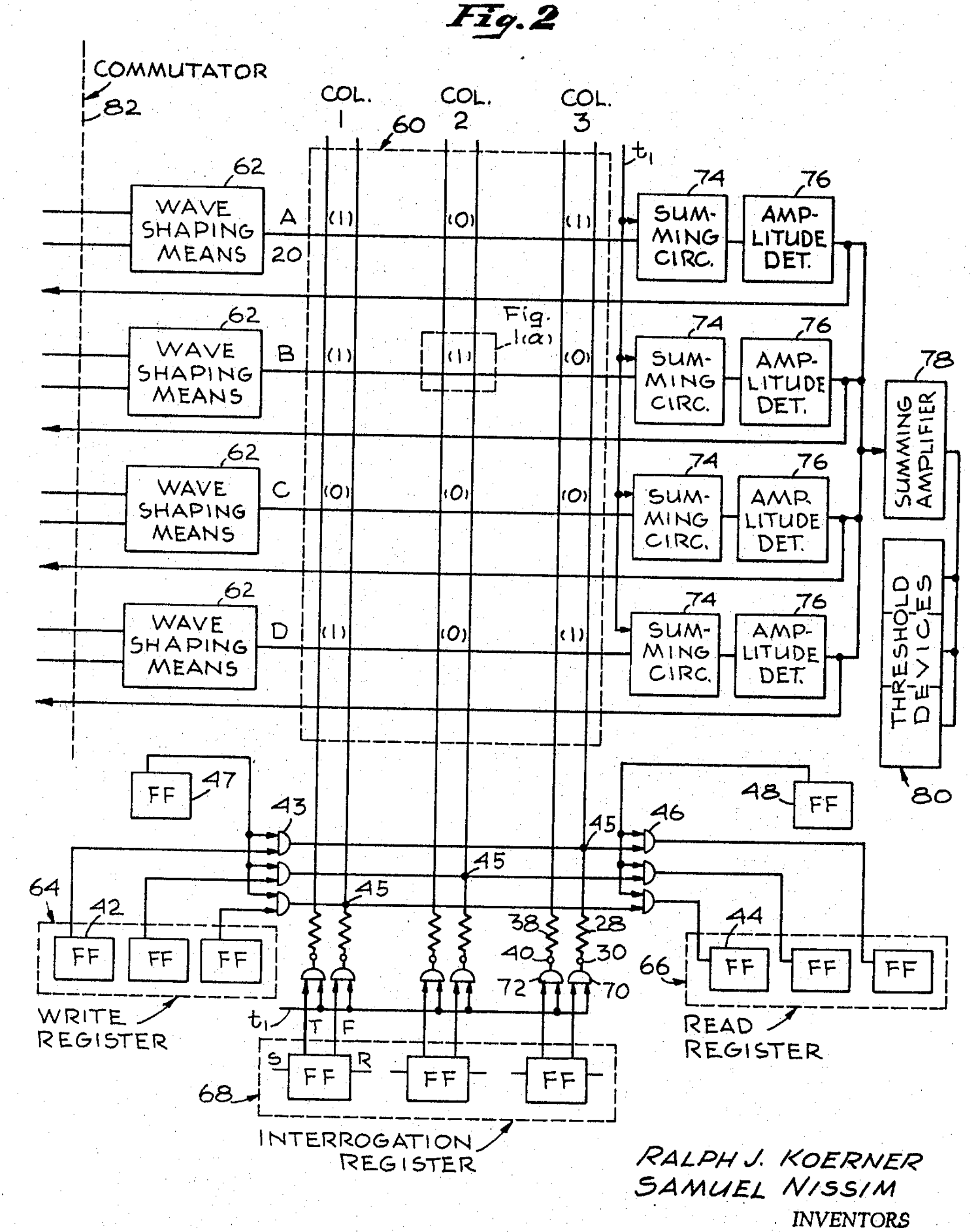
FIG. 2 is a schematic diagram of a content addressable memory configuration utilizing the memory cell of FIG. 1(*a*)

Having discussed the characteristics of the individual memory cell of FIG. 1(*a*), the utility of the configuration in a content addressable memory will now be considered. Accordingly, attention is now called to FIG. 2 wherein a content addressable memory in accordance with the present invention is schematically illustrated. The content addressable memory comprises a memory cell matrix 60 in which information is actually stored, and associated equipment enabling information to be written into and read from the matrix and enabling the information in the matrix to be searched and read out.

The illustrated cell matrix includes 12 memory cells of the type shown in FIG. 1(*a*) arranged to define along horizontal rows, word locations A, B, C and D each three bits in length. Whereas all of the cells in one horizontal row comprise bits of the same word location, all of the cells in each column comprise a bit of the same significance in each of the word locations. A word line

20 is associated with each word location and is common to all of the cells of the word location in the manner shown in FIG. 1(*a*). Input means are coupled to the cells of each column via terminals 30 and 40 and resistors 28 and 38 which are common to all of the cells of the particular column.

A waveshaping means 62 is associated with each word line 20 in the matrix and performs the function of selectively providing the write and read signals shown in lines 1 and 3 of FIG. 1(*b*). The waveshaping means are selectively controlled by read and write control flip-flops 48 and 47 together with commutator means which will be discussed below in conjunction with FIG. 3. It will suffice here to say that the waveshaping means are so interconnected that no two will be concurrently energized. Accordingly, a single write register 64 comprising three of the data write flip-flops 42 are respectively connected to junction 45, through "and" gates 43, of each of the three matrix columns. Similarly, a single read register 66 comprising three of the data read flip-flops 44 of FIG. 1(*a*) are respectively connected to junctions 45, through "and" gates 46, of the three matrix columns. Therefore, in order for data to be written into any matrix location, it is merely necessary that flip-flop 47 be true and the waveshaping means 62 associated with that location be caused to generate the signal illustrated on line 1 of FIG. 1(*b*). If the signals illustrated on line 2 of FIG. 1(*b*) are concurrently applied to junction 45 in accordance with the information held in write register 64, the appropriate information will consequently be stored in accordance with the previous explanation. Information is read out of a location in the matrix by setting flip-flop 48 true and causing the waveshaping means 62 associated with that location to generate the read pulse shown on line 3 of FIG. 1(*b*). Depending upon the storage content of the location cells, the resulting inputs to the flip-flops of the data read register 66 will comprise either of the signals shown in line 4 of FIG. 1(*b*).

In order to search the memory for known information, an interrogation means comprising an interrogation register 68 is provided. The interrogation register 68 includes three flip-flops corresponding to the three matrix columns. The false output terminal of each of the flip-flops of the interrogation register 68 respectively comprise one input to each of "and" gates 70 whose outputs are connected to terminal 30. The true output terminals of the flip-flops of the interrogation register 68 comprise one input to "and" gates 72 whose outputs are connected to terminals 40. The second input to each of the "and" gates 70 and 72 comprises the output of some timing or control means (not shown) and is designated $t_1$. Although for clarity of explanation, the data write register 64, the data read register 66, and the interrogation register 68 are individually shown, it is pointed out that in a minimum hardware implementation one or two registers could be used in their stead on a time sharing basis if appropriate control circuitry is provided.

In order to simultaneously search the entire memory to determine whether or not the search word appears therein, the interrogation register 68 is loaded with the search word and together with the input line $t_1$ causes signals to be driven up along the matrix columns such that each cell which stores a binary quantity different from that quantity stored in a corresponding bit of the search word will generate a pulse on the word line associated with it. This principle is best illustrated by an example. Assume that the contents of each memory word location is as follows:

| | |
|---|---|
| Word A | 101 |
| Word B | 110 |
| Word C | 000 |
| Word D | 101 |

Assume additionally that it is desired to determine whether the word 110 is stored in any memory location. Accordingly, it is initially necessary to write this information into the interrogation register. This will necessitate setting the flip-flops associated with columns 1 and 2 and resetting the flip-flop associated with column 3 of the interrogation register 68. When a pulse is then applied to line $t_1$, pulses will in turn issue from "and" gate 72 associated with columns 1 and 2 and "and" gate 70 associated with column 3. Considering column 1, whose action is typical of all the columns, it will be appreciated that the cells thereof in words A, B and D will cause no output to be applied to their respective word lines 20 in accordance with the operation previously summarized in FIG. 1(*d*). However, since the cell in column 1 of word C stores a "0," the pulse issued from "and" gate 72 associated with column 1 in turn causes a pulse on the word line 20 of word location C. Similar operations take place with respect to columns 2 and 3 and it will accordingly be appreciated that the only word line on which no signals are generated is the word line associated with word location B. The absence of a pulse on the word line of word location B identifies the contents of word B as matching the search word.

One technique for utilizing the null on a word line, i.e., the absence of signals, to perform further operations is to provide a summing circuit 74 associated with each word line. In this implementation, the same signal applied to line $t_1$ to open gates 70 and 72 is applied to each of the summing circuits 74 together with the signals on the respective word lines 20. The outputs of the summing circuits 74 are respectively connected to the inputs of amplitude detectors 76. The amplitude detectors 76 are responsive to sums equal to the amplitude of the signal normally applied to line $t_1$ such that only the amplitude detectors associated with word lines 20 on which a null appeared will generate an output signal hereafter called a match signal.

It will be appreciated that the example previously considered involved a unique match situation; i.e., one and only one location in memory stored the search word. Had the search word been 101, null conditions would have been established on the word lines associated with both word locations A and D and accordingly the amplitude detectors 76 of both of these words would have generated a match signal.

Having seen how a determination can be made as to whether or not particular information exists in memory, it is now well to point out how such information, once located, could be utilized. In a first situation, it may merely be desired to know, for example, how many persons on a company payroll are between 60 and 65 years of age. That is to say, there is a need to know how many persons fall into this age group without needing to know who these persons are or for that matter any other information about these persons. In this hypothetical situation, it is assumed that the memory stores a list of company employees together with pertinent information with respect to each. It is assumed that all the information about one employee is contained in one word in memory and that any word in memory contains information with respect to only one employee. It is also assumed that age group information with respect to each employee is contained in columns 1, 2 and 3 of the memory matrix and that other information (e.g., name, sex, etc.) is contained in other matrix columns (not shown). Accordingly, binary coded information representing the age group 60–65 is written into the interrogation register 68. In accordance with the foregoing, it is apparent that the amplitude detector 76 associated with each word location containing information identifying an employee as being in this age category will generate a match signal. Summing amplifier 78 is employed to sum the outputs of the several amplitude detectors 76. The output of the summing amplifier 78 is connected to a plurality of threshold devices 80, each of which is responsive to a different quantitative output of the amplifier 78. By this technique, it should be apparent that the number of employees in the particular age group will be indicated by which threshold device is energized.

Figure 3:
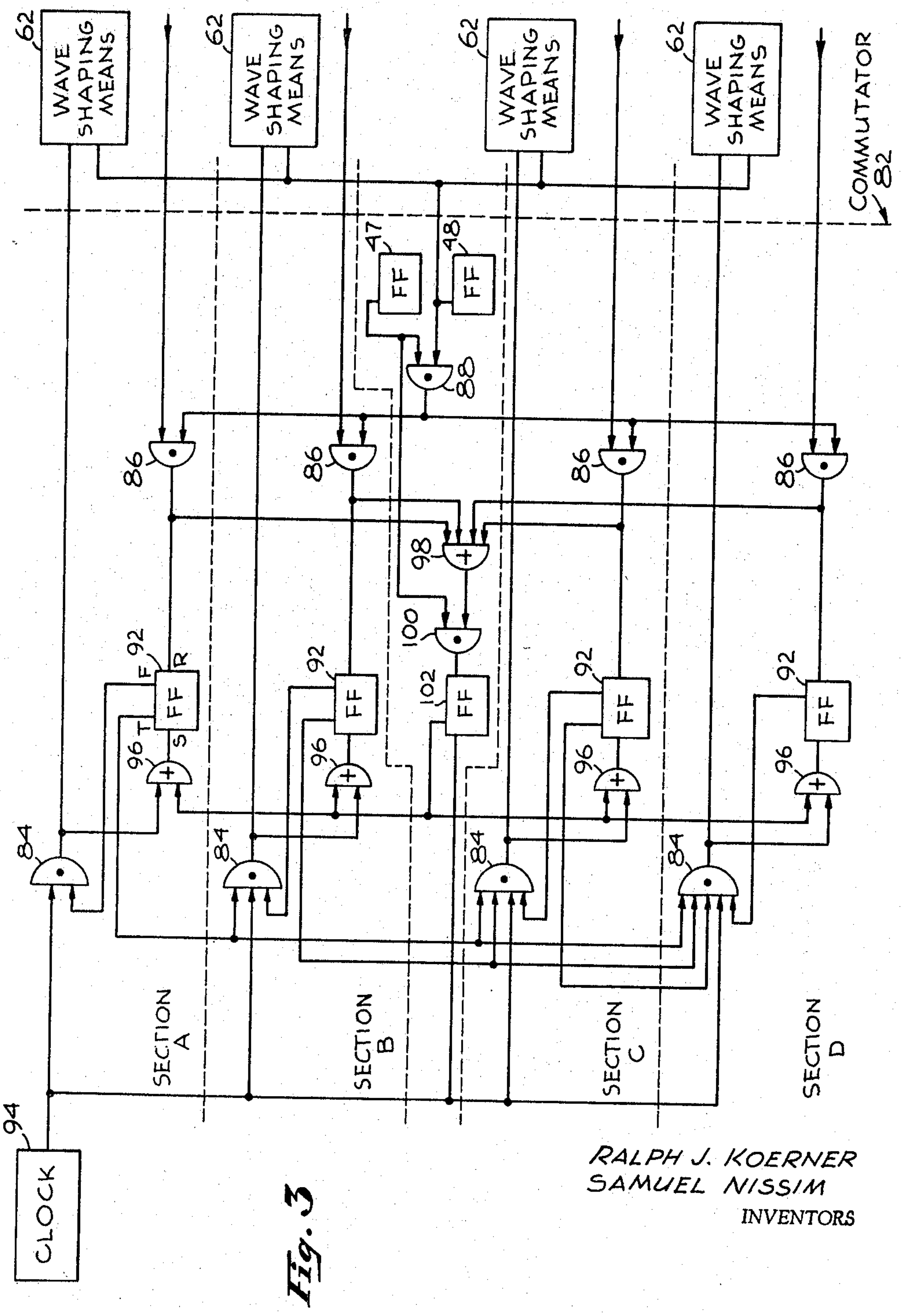
FIG. 3 is a schematic diagram illustrating a commutator configuration which can be used with the memory configuration of FIG. 2.

In other situations, it may be insufficient to merely ascertain how many employees are in a particular age group. For example, it may be desired to generate a list of all persons over 60 years old in order to anticipate impending retirements. For this purpose, it is insufficient to merely sum the outputs of the amplitude detectors 76 in amplifier 78. It is necessary to utilize the outputs of the amplitude detectors 76 to cause the word associated with each amplitude detector generating a match signal to be read out into the data read register 66. In order to do this, a commutator 82 is provided to successively energize the necessary waveshaping means 62 to generate the read pulse of line 3 in FIG. 1(*b*). A suitable commutator implementation is illustrated in FIG. 3.

Commutator 82 comprises four sections each of which is uniquely associated with one of the word locations in the memory matrix and each of which is identical to the others except for the inputs to "and" gates 84 thereof. Each of the sections includes an "and" gate 86, one of whose inputs comprises the output of its associated amplitude detector. The second input to each of the "and" gates 83 comprises the output of "or" gate 88 whose inputs comprise the true outputs of read and write control flip-flops 48 and 47.

Read and write control flip-flops 48 and 47 are utilized to control the energization of the waveshaping means 62; i.e., if a word is to be read from memory, read control flip-flop 48 is set. Similarly, if information is to be written into memory, write control flip-flop 47 is set.

Each of the commutator sections includes a flip-flop 92 having its reset input terminal connected to the output of the "and" gate 86 of the same section. The false output terminal of each of the flip-flops 92 is connected to the input of the "and" gate 84 of the same section. In addition, the output of clock source 94 is connected to the input of each of the "and" gates 84. The output of each "and" gate 84 is connected to an associated waveshaping means 62 and also to an "or" gate 96 whose output in turn is connected to the set input terminal of an associated flip-flop 92.

In order to provide for the contents of matched locations to be sequentially read out from memory after a search is performed thereupon, it is necessary to provide some means for establishing a priority when a non-unique match situation is encountered; i.e., when the contents of more than one memory location match the search word. A priority system is established by connecting the true output terminal of flip-flop 92 of commutator section A to the inputs of "and" gates 84 of commutator sections B, C and D. Similarly, the true output terminal of flip-flop 92 of commutator section B is connected to the input of "and" gates 84 of section C and W while the true output terminal of flip-flop 92 of section C is connected to the input of "and" gate 84 of section D.

In operation, assume the situation where a non-unique match occurs and it is desired to read out sequentially the contents of the matched locations. Recall, for example, that a non-unique match situation was encountered in discussing FIG. 2 when the search word was 101. In that example, it was indicated that the amplitude detectors 76 associated with the word locations A and D would generate match signals. If it is desired that the contents of words A and D be read out, it is necessary to set read control flip-flop 48. By so doing, the output of "or" gate 88 will be made true. Consequently, the outputs of "and" gates 86 of commutator sections A and D will become true while the outputs of "and" gates 86 of commutator sections B and C will not. Assuming that flip-flops 92 had all been previously set, flip-flops 92 of sections A and D will now be reset. Consequently, at the occurrence of the first clock pulse provided by source 94, the output of "and" gate 84 of commutator section A will become true. This first clock pulse will have no effect on the "and" gates of sections B and C since the flip-flops 92 of these sections have remained true and accordingly disable "and"

gates 84 thereof. "And" gate 84 of section D whose associated flip-flop 92 has been reset, will be disabled at the time of the first clock pulse by the connection from the true output terminal of flip-flop 92 of section A.

The first clock pulse provided by source 94, in addition to providing an input to the waveshaping means 62 associated with section A will set flip-flop 92 of section A to thereby remove the disability from gate 84 of section D. Consequently, when the next clock pulse occurs, the output of gate 84 of section D will become true thereby pulsing the waveshaping means 62 associated with that section and setting flip-flop 92 of commutator section D.

From the foregoing explanation, it will be appreciated that commutator 82 of FIG. 3 serves to sequentially energize the appropriate waveshaping means 62 for driving a read or write signal along the word lines 20 through the memory matrix by jumping between matched sections rather than by sampling every section. It will be recalled that in order to write information into the matrix, the signal on line 1 of FIG. 1(*b*) is employed; i.e., a positive voltage excursion followed by a negative voltage excursion. In order to read from the memory, only the negative voltage excursion shown in line 3 of FIG. 1(*b*) is employed. In order to selectively cause the desired read or write signal to be applied to the word line, the true output terminal from the read control flip-flop 48 is connected to the input of each of the waveshaping means 62 so as to cause the normal output signal from the waveshaping means (the write pulse FIG. 1(*b*), line 1) to be rectified when the read control flip-flop is set to thereby generate the read pulse (FIG. 1(*b*), line 3), on the word line 20.

From the foregoing, it should now be appreciated how all locations in the memory matrix can be *simultaneously* searched and how all resulting matches can be sequentially read therefrom by a jump commutation procedure.

Several different techniques can be employed in order to write information into the memory matrix. As a general rule, it is not necessary to know in what location information is going to be stored since in content addressable configurations, information is not accessed by way of location address. Accordingly, it is only necessary that information to be stored in the memory be loaded into a vacant location. Therefore, assuming 000 to represent a vacant location, 000 can be utilized as the search word and accordingly if any locations are vacant, the amplitude detector associated with such a location will provide an output which in turn causes the flip-flop 92 of the commutator section associated with the vacant location to be reset. As will be apparent from previous explanations, upon the occurrence of the first subsequent clock pulse from source 94, the output of gate 84 of that commutator section will cause the waveshaping means 62 to generate the necessary write pulse on the matrix word line.

Since it is generally not desired to write the same information into more than one vacant location, means must be provided for preventing such an occurrence which would be normal in situations where more than one location is vacant and a non-unique match situation ensues. The means provided for preventing such an occurrence comprises an "or" gate 98 whose inputs respectively comprise the outputs of "and" gates 86 of all of the commutator sections. The output of "or" gate 98 is connected to the input of "and" gate 100 together with the true output terminal of write control flip-flop 47. The output of "and" gate 100 is connected to the reset input terminal of flip-flop 102 whose true output terminal is connected to the input of all of "or" gates 96 of the commutator sections. Clock pulse source 94 is connected to the set input terminal of flip-flop 102.

Accordingly, in situations where information is to be written into the memory matrix, write control flip-flop 47 is set and a search is performed utilizing 000 as the search word. Regardless of whether a unique or a non-unique match occurs, the output of gates 98 and 100 will be true and accordingly flip-flop 102 will be reset. This action, of course, will be concurrent with the resetting of the flip-flops 92 in each of the commutator sections corresponding to the matched or vacant locations. Upon the occurrence of the first subsequent clock pulse from source 94, flip-flop 102 will be set and this in turn will cause all of the flip-flops 92 in each of the commutator sections to be set to thereby disable all of the gates 84. Therefore, only the first clock pulse will generate an input to a waveshaping means 62 and all succeeding clock pulses will be ineffective to do so. The resulting write pulse generated on the word line 20 of the vacant location will cause the contents of write register 64 to be written therein.

Several other techniques could be employed for writing information into memory. For example, in some instances it may be desirable to utilize a dedicated bit in each location to indicate whether or not the location is vacant. According to another technique, it may be desirable to write information in specific, rather than merely vacant, locations in the memory matrix. If it is so desired, it would be convenient to store an address code as part of the word in each location. This latter technique would permit the referencing of a particular location by utilizing the location address as the search word.

The foregoing is considered as illustrative only of the principles of the invention. Since numerous modifications will readily occur to persons skilled in the art, it is not desired to limit the invention to the exact construction and operation shown and described and accordingly all suitable modifications and equivalents are intended to fall within the scope of the invention as claimed.

The following is claimed as new:

1. A memory system for storing and retrieving digital information comprising:

a memory cell matrix including a plurality of memory cells, each capable of storing information, arranged to define word locations;

each of said memory cells including a negative resistance device having first and second terminals;

means loading said device for bistable operation; and first and second switch means respectively coupled to said first and second terminals, said first switch means being conductive in response to the assumption by said device of a first state and said second switch means being conductive in response to the assumption by said device of a second state.

2. The memory system of claim 1 wherein said negative resistance device in each of said memory cells comprises a tunnel diode.

3. The memory system of claim 1 wherein at least one of said switches in each of said memory cells comprises a diode.

4. A memory system for storing and retrieving digital information comprising:

a memory cell matrix including a plurality of memory cells, each capable of storing information, arranged to define word locations;

each of said memory cells including a negative resistance device having first and second terminals;

means loading said device for bistable operation; and first and second switch means respectively coupled to said first and second terminals, said first switch means being conductive in response to the assumption by said device of a first state and said second switch means being conductive in response to the assumption by said device of a second state; and means for simultaneously determining the content of the cells of each word location without changing the content thereof including means for generating an interrogation signal with respect to each corresponding cell of all of said word locations and for selectively applying said interrogation signals to said first and second switch means.

5. A memory system for storing and retrieving digital information comprising:

a memory cell matrix including a plurality of memory cells, each capable of storing information, arranged to define word locations;

each of said memory cells including a negative resistance device having first and second terminals;

means loading said device for bistable operation; and first and second switch means respectively coupled to said first and second terminals, said first switch means being conductive in response to the assumption by said device of a first state and said second switch means being conductive in response to the assumption by said device of a second state;

said loading means including first and second impedances and a voltage source; said first impedance connected between said first device terminal and said voltage source; a word line; said second impedance connected between said second device terminal and said word line;

means for simultaneously determining the content of the cells of each word location without changing the content thereof including first means for generating an interrogation signal with respect to each corresponding cell of all of said word locations and for selectively applying said interrogation signals to said first and second switch means; and second means comprising amplitude detection means connected to each of said word lines.

6. A memory cell suitable for use in content addressable memory systems comprising:

a negative resistance device having first and second terminals;

means loading said device to cause it to assume either a first or second stable state, said first state characterized by a relatively high potential at said first terminal and a relatively low potential at said second terminal, said second state characterized by a relatively low potential at said first terminal and a relatively high potential at said second terminal; and first and second switch means respectively coupled to said first and second terminals, each switch means being conductive in response to a relatively low potential at the terminal coupled thereto.

7. The memory cell of claim 6 wherein said negative resistance device comprises a tunnel diode.

8. The memory cell of claim 6 wherein at least one of said switches comprises a diode.

9. A memory cell suitable for use in content addressable memory systems comprising:

a negative resistance device having first and second terminals;

means loading said device to cause it to assume either a first or second stable state, said first state characterized by a relatively high potential at said first terminal and a relatively low potential at said second terminal, said second state characterized by a relatively low potential at said first terminal and a relatively high potential at said second terminal;

first and second switch means respectively coupled to said first and second terminals, each switch means being conductive in response to a relatively low potential at the terminal coupled thereto;

said loading means including first and second impedances and a voltage source; said first impedance connected between said first terminal and said voltage source; a word line; said second impedance connected between said second terminal and said word line; and means for determining the state of said negative resistance device without changing the state thereof including means for generating an interrogation signal and selectively applying it to said first and second switch means.

10. A memory cell suitable for use in content addressable memory systems comprising:

a negative resistance device having first and second terminals;

means loading said device to cause it to assume either a first or second stable state, said first state characterized by a relatively high potential at said first terminal and a relatively low potential at said second terminal, said second state characterized by a relatively low potential at said first terminal and a relatively high potential at said second terminal;

first and second switch means respectively coupled to said first and second terminals, each switch means being conductive in response to a relatively low potential at the terminal coupled thereto;

said loading means including first and second impedances and a voltage source; said first impedance connected between said first device terminal and said voltage source; a word line; said second impedance connected between said second device terminal and said word line;

means for determining the state of said negative resistance device without changing the state thereof including first means for generating an interrogation signal and selectively applying it to said first and second switch means; and second means comprising amplitude detection means connected to said word line.

References Cited

RCA Technical Notes "Nondestructive Tunnel Diode Memory Call" by Amodei et al., September 1961, pp. 1–5.

BERNARD KONICK, *Primary Examiner.*

TERRELL W. FEARS, *Examiner.*